United States Patent
Venkataraja

(10) Patent No.: US 8,037,058 B2
(45) Date of Patent: Oct. 11, 2011

(54) REDUCING ACCESS TIME FOR DATA IN FILE SYSTEMS WHEN SEEK REQUESTS ARE RECEIVED AHEAD OF ACCESS REQUESTS

(75) Inventor: Hariprasad Nellitheertha Venkataraja, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 370 days.

(21) Appl. No.: 12/420,834

(22) Filed: Apr. 9, 2009

(65) Prior Publication Data

US 2010/0262594 A1 Oct. 14, 2010

(51) Int. Cl.
*G06F 17/30* (2006.01)
(52) U.S. Cl. ........ 707/716; 707/715; 707/822; 707/823; 707/828; 711/112; 711/114
(58) Field of Classification Search .................. 707/716, 707/715, 822, 823, 828; 711/114, 112
See application file for complete search history.

(56) References Cited

U.S. PATENT DOCUMENTS

| | | | |
|---|---|---|---|
| 5,652,858 A | 7/1997 | Okada et al. | |
| 6,038,570 A * | 3/2000 | Hitz et al. | 1/1 |
| 6,138,126 A * | 10/2000 | Hitz et al. | 1/1 |
| 6,434,663 B1 * | 8/2002 | Grimsrud et al. | 711/111 |
| 6,567,887 B2 | 5/2003 | Harmer | |
| 6,628,294 B1 | 9/2003 | Sadowsky et al. | |
| 6,751,637 B1 * | 6/2004 | Hitz et al. | 1/1 |
| 6,868,417 B2 | 3/2005 | Kazar et al. | |
| 6,910,117 B2 | 6/2005 | Shieh | |
| 6,965,989 B1 * | 11/2005 | Strange et al. | 713/1 |
| 7,206,795 B2 | 4/2007 | Bono | |
| 7,231,412 B2 * | 6/2007 | Hitz et al. | 1/1 |
| 7,818,498 B2 * | 10/2010 | Hitz et al. | 711/114 |
| 2005/0050108 A1 | 3/2005 | Sawant et al. | |
| 2007/0260842 A1 | 11/2007 | Faibish et al. | |

FOREIGN PATENT DOCUMENTS

WO WO/2004036408 A2 4/2004

(Continued)

OTHER PUBLICATIONS

"File Systems and Disk Layout", "http://www.cs.duke.edu/courses/spring01/cps110/slides/disk-fs.pdf", Circa: Apr. 2001, pp. 1-12.

(Continued)

*Primary Examiner* — Jean M Corrielus
(74) *Attorney, Agent, or Firm* — Narendra Reddy Thappeta

(57) ABSTRACT

Reducing access time for data in a file system when seek requests are received ahead of access requests. In one embodiment, an operating system providing access to the file system receives a seek request (from a user application) indicating an identifier of a file and a location within the file at which a data is sought to be accessed. In response, the operating system computes the offset of a disk block containing the location (thereby the data that is sought to be accessed). On receiving an access request (after the seek request from the same user application) indicating an operation to be performed on the data, the operating system executes the operation on the data using the pre-computed offset of the disk block. The computation of the disk block is performed before the access request is received thereby reducing the time required to process the access request.

20 Claims, 7 Drawing Sheets

FOREIGN PATENT DOCUMENTS

WO  WO/2006065416 A2  6/2006

OTHER PUBLICATIONS

"Peng Gu; etal.,", "Nexus: A Novel Weighted-Graph-Based Prefetching Algorithm for Metadata Servers in Petabyte-Scale Storage Systems", "http://www.eece.maine.edu/~zhu/papers/CCGrid06.pdf", Dated: 2006, pp. 1- 8.

"Behdad Esfahbod", "Preload—An Adaptive Prefetching Daemon", "http://www.techthrob.com/tech/preload_files/preload.pdf", Copyright Date: 2006, pp. 1-81.

* cited by examiner

REDUCING ACCESS TIME FOR DATA IN FILE SYSTEMS WHEN SEEK REQUESTS ARE RECEIVED AHEAD OF ACCESS REQUESTS

BACKGROUND

1. Technical Field

The present disclosure relates to system software and more specifically to reducing access time for data in file systems when seek requests are received ahead of access requests.

2. Related Art

File systems enable data to be stored and retrieved from a storage device in the form of files. As is well known, a file represents a collection of data that is identified by a corresponding file name. Files can be grouped into one or more folders/directories which are generally organized in the form of a hierarchy/tree. As such, each file is uniquely identified by its file name and its location (termed "path") in the hierarchy with respect to a root directory. Examples of files systems are NTFS (New Technology File System) for Windows operating system, EXT2 (second extended file system) and EXT3 (third extended file system) for Linux/Unix family of operating systems, etc.

Data forming a file is typically stored in the form of one or more blocks on the storage device, with the blocks being contiguous or scattered in non-contiguous blocks of the storage device. File systems typically maintain data structures that indicate the blocks that form each file along with other "metadata" related to each file. The metadata may include information such as the name of the file, the path of the file, date of creation, date of modification, access control, etc. File systems may also maintain data structures that specify the details of the folder/directory hierarchy.

Accessing data (from an application) in a file entails sending one or more requests to the file system. In one approach, each access to data is performed by first sending a seek request to an operating system providing access to the file system, followed by an access request. The seek request indicates information such as the name and/or path of the file, and the absolute/relative location of the data within the file (typically indicated as the number of bytes/words from the start of the file which is assumed to be 0) sought to be accessed. On receiving the seek request, the operating system stores the corresponding information in a memory.

The following access request indicates the name/path of the file, the operation (read/write) to be performed on the data indicated by the seek request, the amount of data (as number of bytes/words) to be read/written (retrieved/stored), and also the new data to be written (stored) to the file. Accordingly, on receiving the access request, the operating system identifies a block on the storage device based on the name/path of the file, the location within the file (stored in the memory based on the seek request) and the data structures maintained in the file system. The operating system then performs the specified read/write operation at the identified block.

It is generally desirable that the access time (from receiving the access request to sending a response indicating the completion of the operation specified in the access request) for data in file systems be reduced, in particular when access to the data in the file system is performed by seek requests received ahead of access requests.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present invention reduces access time for data in a file system when seek requests are received ahead of access requests. In one embodiment, an operating system providing access to the file system receives a seek request (from a user application) indicating an identifier of a file and a location within the file at which a data is sought to be accessed. In response, the operating system computes the offset of a disk block containing the location (thereby the data that is sought to be accessed).

On receiving an access request (after the seek request from the same user application) indicating an operation to be performed on the data, the operating system executes the operation on the data using the pre-computed offset of the disk block. The computation of the disk block offset is performed before the access request is received thereby reducing the time required to process the access request.

According to another aspect of the present invention, an operating system stores the computed offsets of disk blocks for different combinations of files and locations in a common cache (in memory). The common cache facilitates different access requests received from different user applications for performing operations in the same file and location within the file to be processed by reusing the stored offsets of the disk blocks. The computation of the offset of the disk block is required to be performed only once when the initial seek request is received, thereby reducing the access time when processing subsequent access requests.

Several aspects of the invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Digital Processing System

Figure 1:
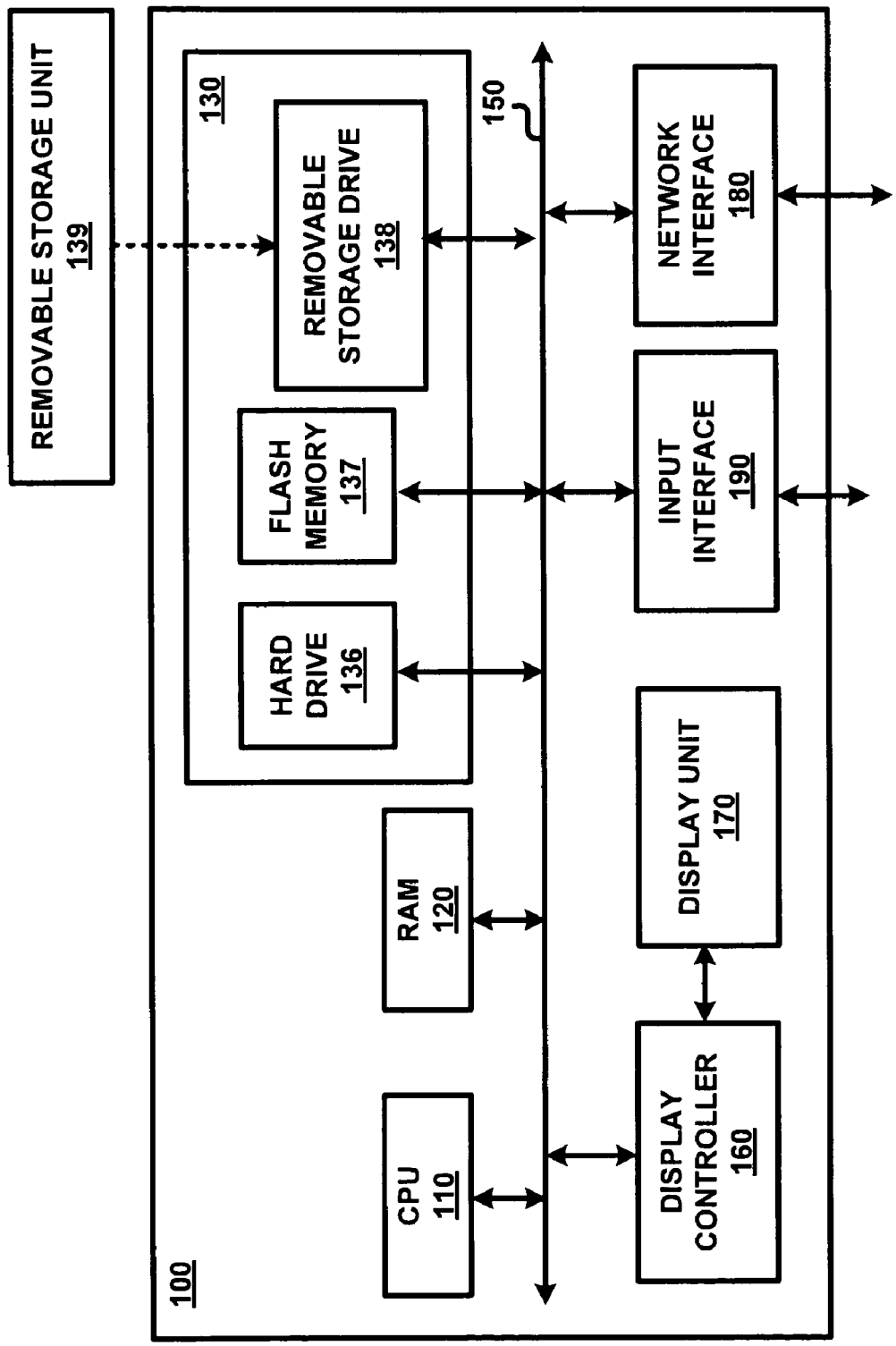
FIG. 1 is a block diagram illustrating the details of a digital processing system in which several aspects of the present invention are operative by execution of appropriate software instructions.

FIG. 1 is a block diagram illustrating the details of digital processing system 100 in which various aspects of the present invention are operative by execution of appropriate software instructions. Digital processing system 100 may contain one or more processors such as a central processing unit (CPU) 110, random access memory (RAM) 120, secondary memory 130, graphics controller 160, display unit 170, network interface 180, and input interface 190. All the components except display unit 170 may communicate with each other over communication path 150, which may contain several buses as is well known in the relevant arts. The components of FIG. 1 are described below in further detail.

CPU 110 may execute instructions stored in RAM 120 to provide several features of the present invention. CPU 110 may contain multiple processing units, with each processing unit potentially being designed for a specific task. Alternatively, CPU 110 may contain only a single general-purpose processing unit. RAM 120 may receive instructions from secondary memory 130 using communication path 150.

Graphics controller 160 generates display signals (e.g., in RGB format) to display unit 170 based on data/instructions received from CPU 110. Display unit 170 contains a display screen to display the images defined by the display signals. Input interface 190 may correspond to a keyboard and a pointing device (e.g., touch-pad, mouse) and may be used to provide inputs. Network interface 180 provides connectivity to a network (e.g., using Internet Protocol), and may be used to communicate with other systems connected to the network.

Secondary memory 130 may contain hard drive 136, flash memory 137, and removable storage drive 138. Secondary memory 130 may store the data (for example, in the form of one or more files organized as a file system) and software instructions, which enable digital processing system 100 to provide several features in accordance with the present invention.

Some or all of the data and instructions may be provided on removable storage unit 139, and the data and instructions may be read and provided by removable storage drive 138 to CPU 110. Floppy drive, magnetic tape drive, CD-ROM drive, DVD Drive, Flash memory, removable memory chip (PCMCIA Card, EPROM) are examples of such removable storage drive 138.

Removable storage unit 139 may be implemented using medium and storage format compatible with removable storage drive 138 such that removable storage drive 138 can read the data and instructions. Thus, removable storage unit 139 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 139 or hard disk installed in hard drive 136. These computer program products are means for providing software to digital processing system 100. CPU 110 may retrieve the software instructions, and execute the instructions to provide various features of the present invention described below.

The execution environment of a digital processing system 100 in which several aspects of the present invention are operative is described below.

3. Execution Environment

Figure 2:
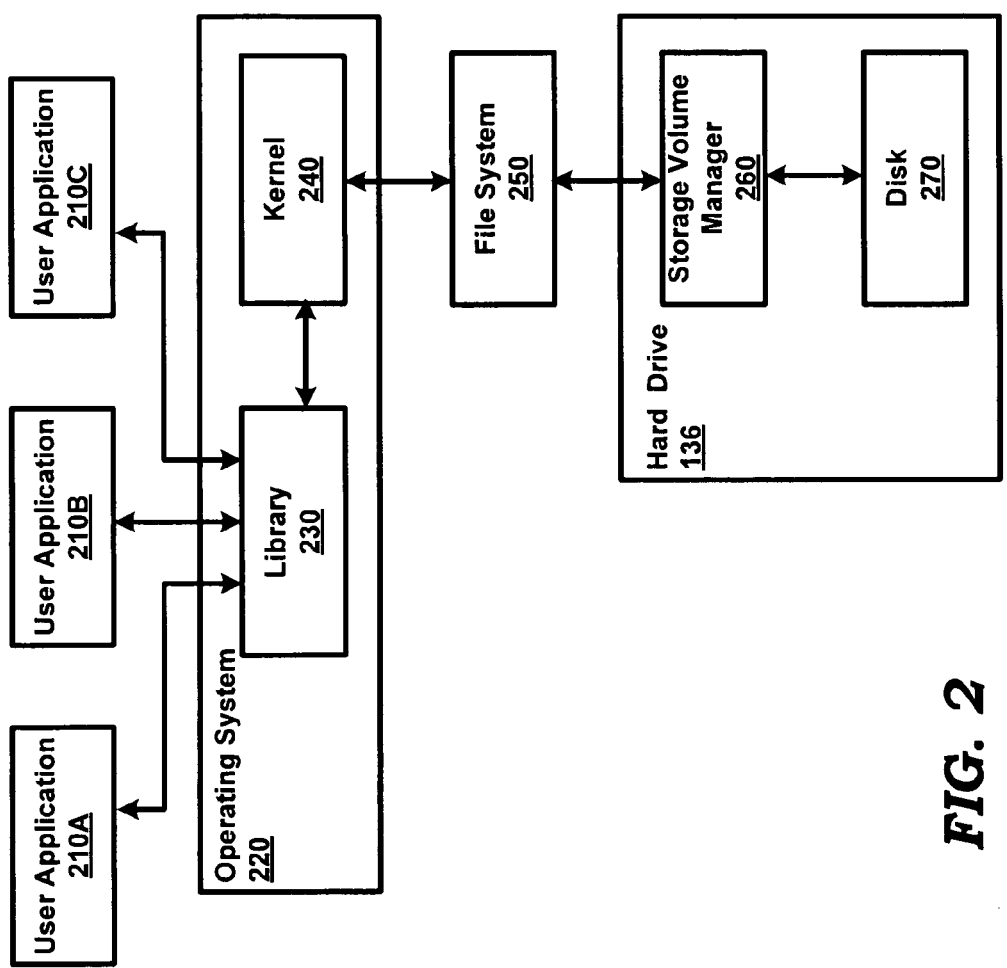
FIG. 2 is a block diagram illustrating the details of an execution environment where data in a file system is accessed using seek requests ahead of access requests in one embodiment.

FIG. 2 is a block diagram illustrating the details of an execution environment (in digital processing system 100) where data in a file system is accessed using seek requests ahead of access requests in one embodiment. The execution environment is shown containing user applications 210A-210C, operating system 220 (containing library 230 and kernel 240), file system 250, storage volume manager 260 and disk 270 (both shown within hard drive 136).

Merely for illustration, only representative number/type of systems is shown in the Figure. Many environments often contain many more systems, both in number and type, depending on the purpose for which the environment is designed. Each system/device of FIG. 1 is described below in further detail.

Hard drive 136 represents a secondary storage device such as a physical medium on which data is stored. Hard drive 136 may contain one or more physical disks such as disk 270. As is well known, data in disk 270 is stored in the form of blocks (or logical units such as sectors, cylinders, etc.) base on the technology (e.g. IDE, SATA, SCSI) using which hard drive 136 is implemented. In particular, a disk block represents the smallest portion of data (having a fixed size) that can be accessed from a hard drive 136 using a corresponding unique identifier (disk block number). Typically, each disk block represents a physical portion on the physical medium providing storage for the hard drive.

Storage volume manager 260 contains various device drivers designed to issue appropriate commands to the hardware (disk 270) for accessing data in secondary storage such as hard drive 136 (e.g., in response to receiving requests from file system 250). Storage volume manager 260 is commonly implemented as a combination of hardware, software or firmware and is provided as part of the secondary storage/hard drive 136.

File system 250 enables data to be accessed in the form of files organized in a hierarchy of folders/directories. File system 250 may represent one of NTFS, EXT2, EXT3 file systems described above. Further, as described above, file system 250 may also maintain data structures that indicate the blocks (in disk 270) that form each file, the "metadata" related to each file such as the name of the file, the path of the file, date of creation, date of modification, access control, etc. and the details of the directory hierarchy.

Each of user applications 210A-210C represents a software/executable module, which on execution, is designed to perform specific tasks. The tasks may be performed in response to receiving indications from users (via input interface 190) using user interfaces (shown on display unit 170) provided by the user applications. During performance of the tasks, user applications 210A-210C may be designed to access the data in files stored in file system 250.

For example, user application 210A may represent an editor application which enables users to edit the content of documents such as configuration data, programming language source code, etc., with each document commonly maintained as a corresponding file in file system 250. Accordingly, user application 210A is designed to access the data in the file corresponding to the document (being edited) and to provide the data (on display unit 170) according to a pre-specified/user-specified format.

Operating system 220 represents a group of software/executable modules such as device drivers, virtual machines, etc. that provide a common environment for execution of user applications (such as 210A-210C). Operating system 220 manages and/or coordinates the activities performed by the different user applications, for example, to avoid conflicts when accessing a shared resource, to prioritize the performance of the activities, to control access to the data stored in secondary storage/file systems, etc. To facilitate coordination of the different activities, the user applications are required to access the functionalities provided by operating system 220 using a common set of routines/functions.

Library 230 represents a software/executable module containing the common set of routines/functions that have to be used by user applications such as 210A-210C to access the functionalities provided by operating system 220. Each routine/function is designed to provide a specific functionality to the user applications by invoking other low-level/system routines that constitute kernel 240. User applications 210A-210C are according designed (by incorporating appropriate software instructions) to invoke the desired routines/functions contained in library 230.

For example, when operating system 220 is a POSIX compliant operating system such as Windows, Linux etc, wherein, library 230 may contain different routines to enable user application to perform specific tasks such as a open routine to open a file for performing operations, a seek routine to send a seek request to file system 250, a read routine to read/retrieve data from file system 250 and a write routine to write/store data in file system 250. Accordingly, user/editor application 210 is designed to invoke open, seek and read routines when retrieving the content of the document (sought to be edited) from the file and to invoke open, seek and write routines when storing edited/updated content to the file.

In one embodiment, library 230 is implemented as one or more object files that are to be compiled and/or linked along with the program/code files (in a programming language such as C, Java, etc.) constituting the user application. The corresponding executable file generated for the user/editor application (when executing in the context of operating system 220) is designed to invoke the desired routines/functions contained in library 230 and correspondingly invoke the required low-level/system functions in kernel 240.

Kernel 240 represents a software/executable module containing the low-level/system routines/functions that are invoked from library 230 to perform desired tasks. System routines, in contrast to the routines in library 230, are generally designed to perform the desired tasks taking into account the underlying hardware architecture such as the speed/type of CPU, the amount of RAM, the input devices connected to input interface 190, the type of file system 250, the speed/type of hard drive 136, etc. In other words, system routines hide the underlying hardware implementation from the routines/functions in library 230.

Kernel 240 (and/or the other modules in operating system 220) also maintains data structures corresponding to the user applications executing in the context of the operating system, the files sought to be accessed in the file system, the hardware specific data, etc. The description is continued illustrating the data structures used in kernel 240 when accessing data in files stored in file system 250 in one embodiment followed by the data structures used in file system 250.

4. Data Structures Used in Operating System

Figure 3A:
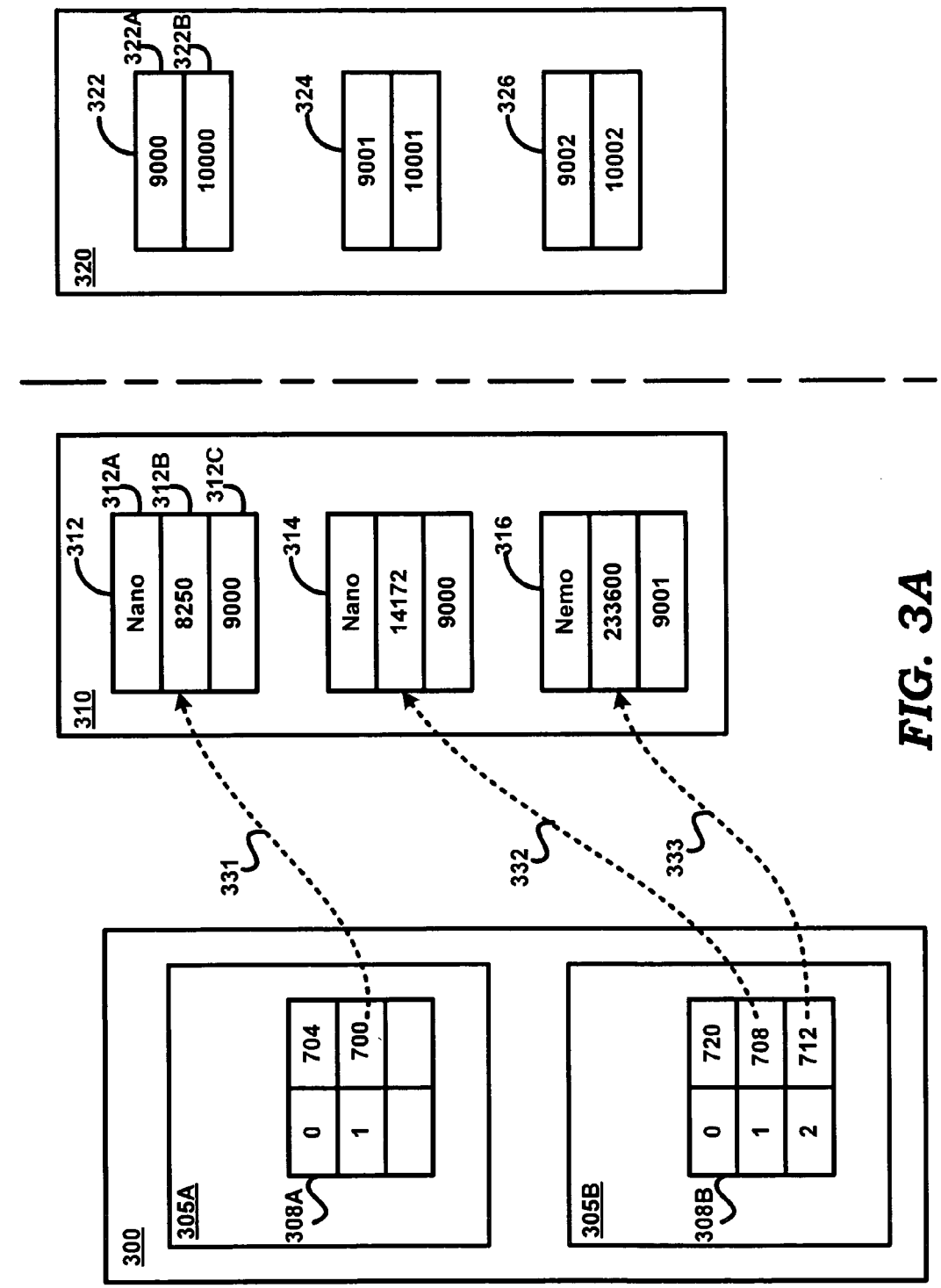
FIG. 3A is a block diagram illustrating the details of data structures used in an operating system when accessing data in a file system in one embodiment.
Figure 3B:
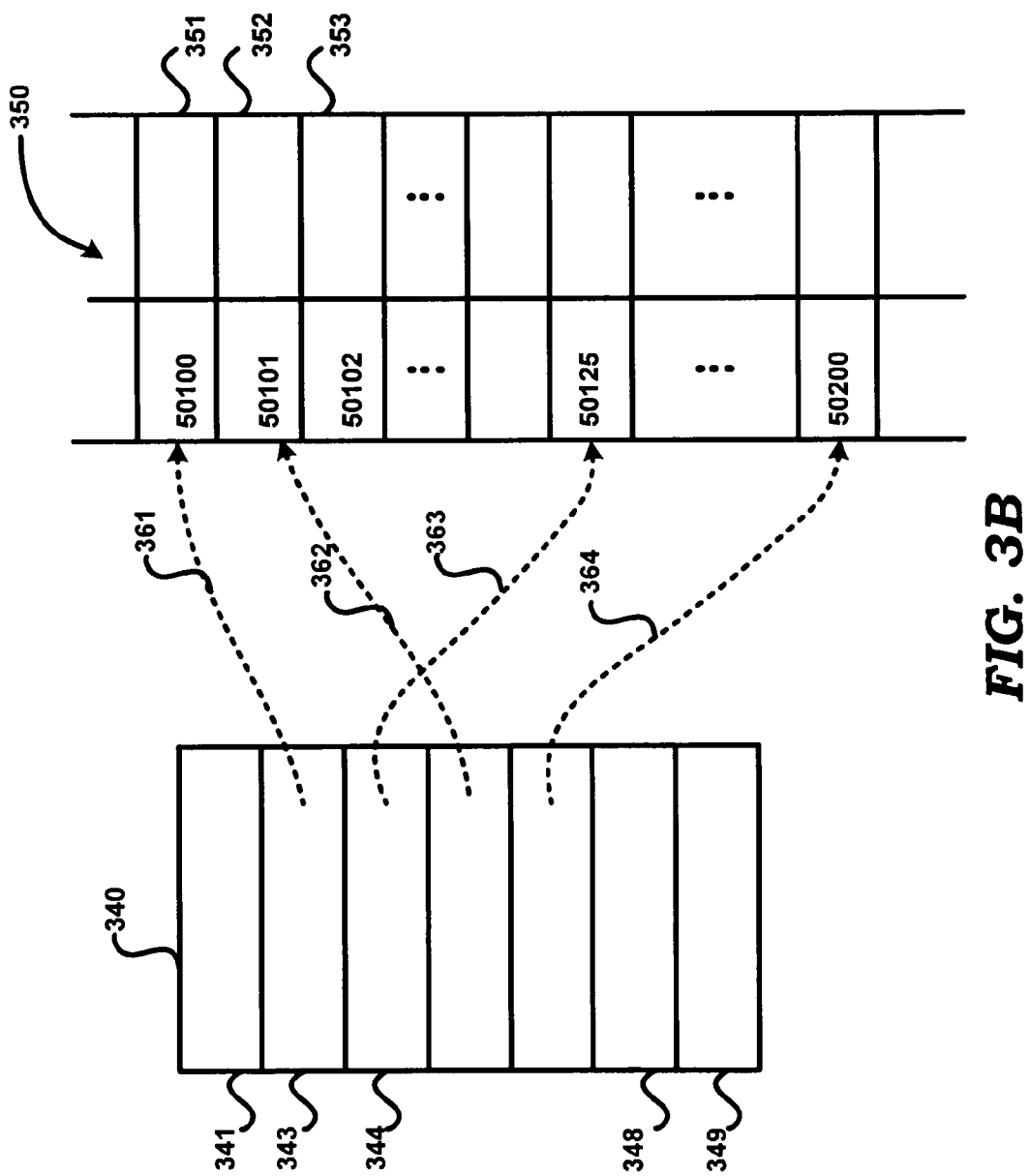
FIG. 3B is a block diagram illustrating the details of data structures used in a file system when accessing data in a file system in one embodiment.
Figure 3C:
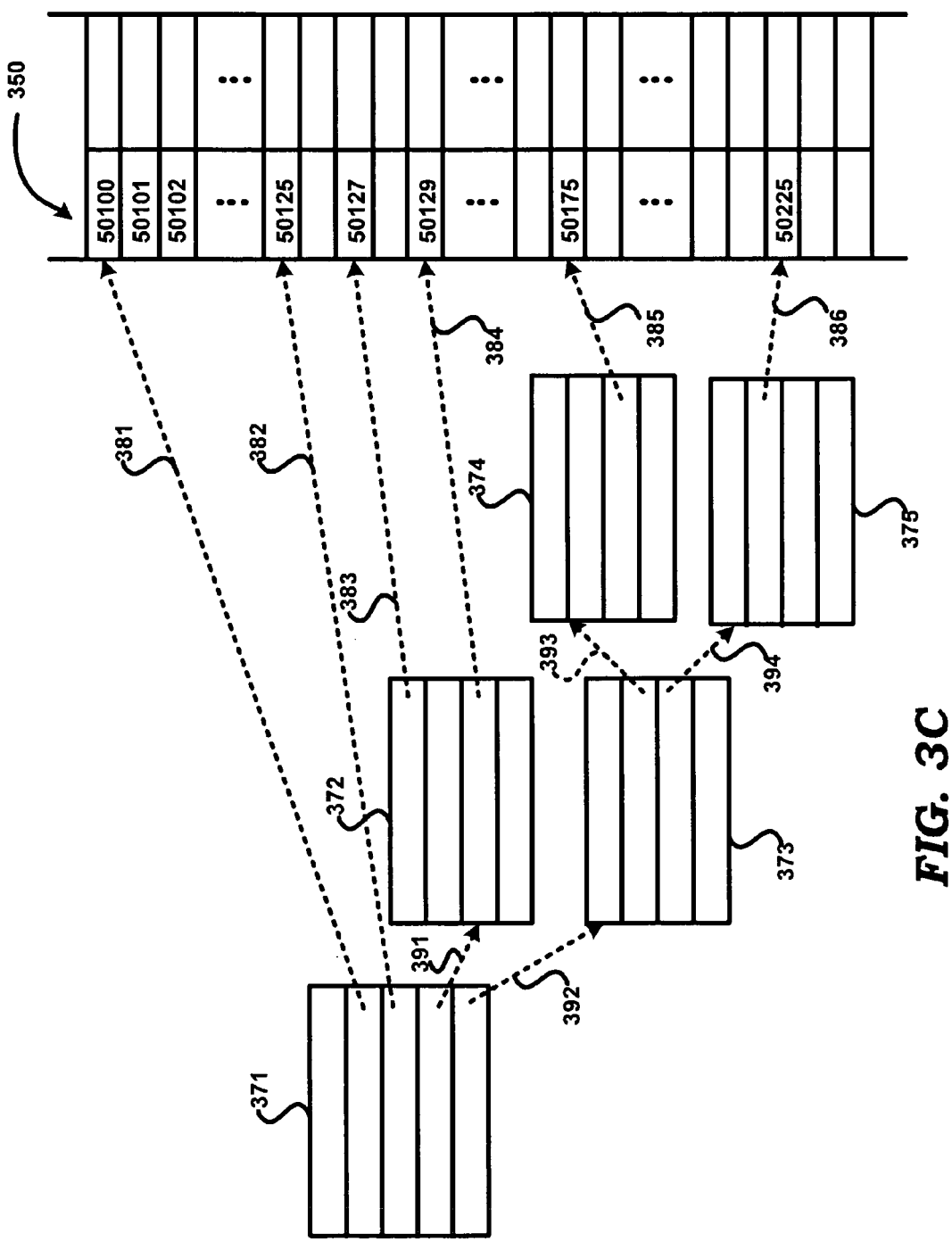
FIG. 3C is a block diagram illustrating the details of data structures used in a file system when storing large files in a file system in one embodiment.

FIGS. 3A-3C together illustrates the data structures used when accessing data in a file system in one embodiment. Only the data structures used in a POSIX compliant operating system providing access to file systems such as NTFS or EXT3 are described in detail below. Further, only the portions of the data structures that are relevant to understanding the features of the present invention are included in each of the Figures.

However, more number and/or different types of data structures (maintained in volatile/non-volatile memory) can be used along with or instead of the data structures described below as will be apparent to one skilled in the relevant arts by reading the disclosure herein. Each of the Figures is described in detail below.

FIG. 3A is a block diagram illustrating the details of data structures used in kernel 240 of an operating system when accessing data in a file system in one embodiment. Process table 300 represents a data structure in RAM 120 which maintains details of processes/applications executed by and/or currently executing in the context of kernel 240 (that is operating system 220). Process entry 305A represents an entry created in process table 300 corresponding to an executing process (e.g. user application 201A). Process entry 305A may contain details of the executing process such as the name of the executable program/file corresponding to the process/application, the status of execution, the priority of the process, etc.

In addition, process entity 305A also contains file descriptor table 308A which maintains information regarding the files that are currently opened/accessed by process 305A. Each file entry in file descriptor table 308A contains a file number uniquely identifying the file for the process (such as 0, 1, 2 etc.) and a pointer to the corresponding file descriptor present in open files table 310. The pointer value (such as 700, 704, 708, 712, etc.) may represent the actual memory location of the corresponding file descriptor (as indicated by arrows 331-333) or may represent a unique identifier identifying the corresponding file descriptor in open files table 310.

Process entry 305B represents another entry created in process table 300 corresponding to another process executing in the context of kernel 240. It may be observed that process entry 305B contains file descriptor table 308B which indicates that the process has currently opened/accessing three files (since the table is shown having three file numbers).

Open files table 310 represents a data structure maintained by kernel 240 in RAM 120, which contains the details of all the files opened by all the processes (such as 305A and 305B) executing in the context of kernel 240. Open files table 310 is shown containing file descriptors 312, 314 and 316, each of which maintains information regarding a corresponding open file.

Thus, file descriptor 312 maintains information ("metadata") regarding a file such as the name of the file ("Nano" in field 312A), the path of the file, a current pointer indicating the location within the file where next operation is to be performed ("8250" in field 312B), status/mode of the file, a virtual node number indicating the unique identifier of a virtual node in virtual nodes table 320 ("9000" in field 312C), etc. It should be noted that the metadata stored in the file descriptor may be a copy of the metadata maintained in file system 250 (e.g. in file nodes) or may be specific information maintained by operating system 220 for each file in the file system.

It may be observed that file descriptor 312 present in open files table 310 is pointed to by the "1" entry in file descriptor table 308A. Further, the same file (named "Nano") may have multiple file descriptors (312 and 314) associated with it, since the data in the same file is sought to be accessed by two different processes (305A and 305B). Accordingly, files descriptors 312 and 314 may maintain similar "metadata" information regarding the file (for example, both the descriptors may point to the same virtual node number). However, it may be observed that the current pointer values in file descriptors 312 and 314 are different based on the portions of data sought to be accessed by the different processes.

Virtual nodes table 320 represents a data structure maintained in disk 270 containing virtual nodes (322, 324 and 326) corresponding to each of the files in open files table 310. Virtual nodes table 320 provides a layer of abstraction for the underlying file nodes, wherein each file node in the underlying file system 250 is provided to the operating system as a corresponding virtual node. Thus, virtual node 322 represents a mapping between the virtual node number '9000' (field 322A) and the file node number '10000' (field 322B) for the file "Nano". The file node number uniquely identifies the file node corresponding to the file as described in detail below.

5. Data Structures Used in File System

FIG. 3B is a block diagram illustrating the details of data structures used in file system 250 when accessing data in a file system in one embodiment. Secondary storage 350 (forming part of disk 270) is shown containing a number of disk blocks (such as 351-353), each of the disk blocks being uniquely identifiable by a corresponding identifier/number (such as "50100", "50101", "50102", etc). The identifier of a disk block specifies the relative location of the disk block with respect to a starting disk block (assumed to have the identifier 0) at the beginning of disk 270. Accordingly, the disk block number can be viewed as specifying the offset of the disk block in disk 270.

Though secondary storage 350 is shown containing a sequence/array of disk blocks, it should be appreciated that the disk blocks can be located in any convenient manner based on the type of the physical media forming disk 270, for example, as circular tracks or portions thereof on a circular media. Accordingly, accessing different disk blocks on disk 270 may require physical movement of the physical media/disk or a head reading the data as is well known in the relevant arts. Each disk block is of a fixed size, usually, 4096 bytes (4 kilobytes, 4 kb in short), though the disk blocks can be of other sizes such as 8 kb, 16 kb as well.

File node 340 represents a data structure maintained uniquely for each file in file system 250. File node 340 is also identifiable by a unique identifier "10000" and accordingly corresponds to the file node mapped in virtual node 322. File node 340, along with other file nodes (not shown) corresponding to other files in file system 250, is typically maintained in a fixed set of disk blocks in disk 270 (for example, in a contiguous set of disk blocks at the beginning of disk 270).

File node 340 maintains information ("metadata") related to the file and also the set of disk blocks where the data forming the file is stored. Accordingly, file node 340 is shown containing different fields such as header 341, data pointer fields 343 and 344, address pointer fields 348 and 349, etc. Header 341 contains the metadata of the corresponding file including owner (i.e., creator of file) user identification number, owner group identification number, device on which the file node resides, locking information of the file, mode and type of file, number of links to the file, size of the file, access and modification time of the file, modification time of the file node, etc.

Each of data pointer fields 343 and 344 points to a corresponding disk block (with identifiers 50100 and 50125 as indicated by pointers 361 and 363) on disk 270 that contain contiguous portions of the data forming the file. It may be observed that data in the contiguous portions of the file (as pointed to by the data pointers) are maintained in non-contiguous disk blocks on disk 270. Subsequent contiguous portions of the file are pointed to by the following data pointers (as indicated by arrows 362 and 364).

Each of address pointers 348 and 349 points to sub-nodes (other file nodes) on the disk 270, with each sub-node in turn containing one or more data pointers and/or address pointers. Such a structure enables file system 250 to maintain large files whose data is stored in a large number of disk blocks on disk 270 as described in detail below.

FIG. 3C is a block diagram illustrating the details of data structures used in file system 250 when storing large files in a file system in one embodiment. Similar numbers are used to represent corresponding portions of FIGS. 3B and 3C and hence descriptions of such portions are not repeated for conciseness.

File node 371 is shown containing data pointers such as 381 and 382 pointing to disk blocks 50100 and 50125 in secondary store 350. File node 371 is also shown containing address pointer 391 and 392 pointing to sub-nodes (other file nodes) 372 and 373. Sub-node 372 is shown containing data pointers such as 383 and 384 that point to the disk blocks 50127 and 50129 on disk 270. Sub-node 373 contains only address pointers such as 393 and 394 pointing to sub-nodes 374 and 375, which in turn contain data pointers such as 385 and 386 that point to disk blocks on disk 270 where the file is stored.

Though only a few pointers for each sub-node is shown in the Figure, it may be appreciated that sub-nodes 372 and 373 are typically used only after all the data pointers in file node 371 have been used to point to corresponding disk blocks on disk 270. In general, the data pointers in file node 371 are first used, followed by the data pointers in sub-node 372, followed by the data pointers in sub-nodes 374 and 375. The data in the file may be viewed as being contiguous in the same order.

Thus, the information regarding a large file whose data is stored in a large number of contiguous/non-contiguous disk blocks is maintained in file system 250. Though only a few levels of sub-nodes are shown, it may be appreciated that any desired number of levels of sub-nodes may be constructed using the data/address pointers provided in each file node/sub-node.

It may be appreciated that accessing data in such a large file may require the "tree" of sub-nodes/file nodes to be traversed (i.e., the data/address pointers need to be followed till the desired disk block is determined). The manner in which the file node tree is traversed when accessing data in a file stored in file system 250 in a prior approach is described below with examples.

6. Prior Approach

Referring to FIG. 3A, when a user/editor application 210A is executed, a process entry such as 305A is created in process table 300. On receiving an indication from a user that a document is sought to be accessed (for viewing and/or editing), the editor application first opens the file (assumed to be "Nano") corresponding to the user indicated document.

Accordingly, user application 210A may first send a request to operating system 220 for opening the file named "Nano" using the functions/routines (e.g., the "open" routine) provided by library 230. The request may also specify the path of the file and the mode (read only, read/write) in which the file is sought to be opened. In response to the open request, kernel 240 creates an entry in the file descriptor table 308A (with file number "1") after creating file descriptor 312 (having the file name "Nano" in field 312B) in open files table 310. File descriptor 312 is created pointing to a virtual node number 9000 (field 312C).

User/editor application 210A is designed to send seek requests (e.g. by invoking the "seek" routine provided by library 230) followed by access requests to access the data in the opened file. In one embodiment, the seek/access requests indicate the unique file number (instead of the name/path of the file). Thus, user application 210A may first send a seek request indicating the file number "1" and the location within the file "8250" (the number of bytes from the start of the file). The location within the file may be determined based on the actions performed by the user, such as scrolling the displayed document, pressing pre-defined keys for scrolling or for accessing the start/end of the document, specifying a search, indicating that a specific paragraph/page/line is to be accessed, etc.

In response to receiving the seek request, kernel 240 identifies the file descriptor (312) corresponding to the file in the open files table 310 and stores the received location specified in the seek request in the current pointer field (312B) of the identified file descriptor. Kernel 240 may send a response to the seek request indicating the status/result of setting the current pointer.

User/editor application 210A may then send access requests (e.g. by invoking the "read" or "write" routines provided by library 230) indicating the file number "1", the operation sought to be performed and the amount of data (in terms of number of bytes/words) sought to be affected by the operation. The operation may also be determined based on the actions performed by the user. For example, when the user is scrolling the document for viewing the content, user application 210A may determine that a read operation is to be performed. Similarly, when the user has edited the content of the document and then indicates (by pressing a key or selecting a menu option) that the edited contents are to be saved, user application 210A may determine that a write operation with the new edited content is to be performed.

In response to receiving an access request (assumed to be read operation for 512 bytes), kernel 240 computes the disk offset corresponding to the current pointer of the file, the disk offset indicating the location in disk 270 of the data sought to be accessed. Accordingly, kernel 240 first identifies the file node "10000" corresponding to the file (using the virtual node number in the file descriptor corresponding to the file number "1" and the mappings in the virtual nodes table 320) and then determines the specific disk block in which the data indicated by the current pointer is located by traversing the file node tree as described in detail below.

Referring to FIG. 3B, kernel 240 identifies file node 340 as corresponding to the file "Nano" based on the file node number "10000" indicated in the virtual nodes table 320 of FIG. 3A. Kernel 240 then calculates the ordinal number of the specific disk block in which the data sought to be accessed is located based on the current pointer and the fixed size of the disk block. In particular, the value of the current pointer is divided by the fixed size and the result is rounded to the next largest integer (equivalent to the "ceiling" mathematical function). Thus, assuming that each disk block has a fixed size of 4 kb, the ordinal number of the specific disk block is calculated to be ceiling (current pointer/fixed size)=ceiling (8250/4096)=ceiling (2.014)=3.

Kernel 240 then traverses the file node tree to identify the third disk block (in general, the ordinal number of the specific disk block) in the list of disk blocks pointed to by the data pointers in the file nodes/sub nodes. Accordingly, for file node 340, kernel 240 identifies disk block 352 (having the disk block number 50101) pointed to by the third data pointer 362 in the file node. In one embodiment described below, kernel 240 identifies the disk block number 50101 as the offset of the disk block in disk 270, the offset indicating the location in disk 270 of the data sought to be accessed. Alternatively, kernel 240 may compute the offset of the disk block (in terms of bytes from the start of disk 270) by multiplying the disk block number (50101) and the fixed size of each disk block (4096).

Kernel 240 then performs the operation specified in the access request on the data in the specific disk block. First, kernel 240 calculates the "internal" offset "58" as the modulo of current pointer (8250) and the file size (4096), where the modulo mathematical function finds the remainder of division of the current pointer by the file size. Kernel 240 then retrieves (since the access request indicates a read operation) the data from byte 58 to byte 569 (calculated as start byte+number of bytes as indicated in the access request−1=58+512−1) from the disk block 50101. Kernel 240 may send the retrieved data as a response to the access request. The response may also indicate the status of performance of the operation (read/write).

A request to perform a write operation may be similarly performed by kernel 240, with the new data specified in the access request used to replace the data in disk block 50101. In one embodiment, the data in the specific disk block is retrieved into a buffer (in RAM 120) to facilitate performance of multiple write operations. After the data in the buffer has been suitably modified, the data is written back to the specific disk block on disk 270.

Thus, the data in a file stored in file system 250 is accessed by user applications executing in the context of operating system 220. It may be appreciated that the access time (determined as the time between receiving the access request and sending a corresponding response) is generally large (in terms of seconds/milliseconds), since kernel 240 is required to perform multiple actions such as finding the ordinal number of the specific disk block, identifying the specific disk block based on traversing the file node tree, storing/retrieving the identified disk block, calculating the internal offset, performing the action and sending a corresponding response.

Access time can be further increased in the case of large files stored in a large number of disk blocks due to the time required for traversing (i.e., following the data/address pointers in) the larger file node tree as shown in FIG. 3C. For example, when file node 371 of FIG. 3C is determined to correspond to the file sought to be accessed and the ordinal number of the specific disk block is determined to be 151, kernel 240 may be required to traverse the file nodes 371-375 to determine the 151st disk block (e.g. disk block "50225" indicated by data pointer 386).

It may be appreciated that though the time required to traverse a large file node tree may be reduced by restructuring the tree (for example, to form a B+ tree, well known in the relevant arts), by maintaining address pointers that skip certain file nodes, or by calculating/maintaining the number of disk blocks in each of the sub-trees, etc., the overall access time (including the time required to perform the other actions) may still be considerably larger than acceptable limits.

Several aspects of the present invention facilitates reducing the access time for data in file systems when seek requests are received ahead of access requests. The description is continued assuming that several features of the present invention are implemented as portions of the executable modules constituting kernel 240. However, in alternative embodiment, the features of the invention can be implemented as independent executable modules executing as part of operating system 220 and tightly coupled to the operation of kernel 240.

7. Inventive Approach

Figure 4:
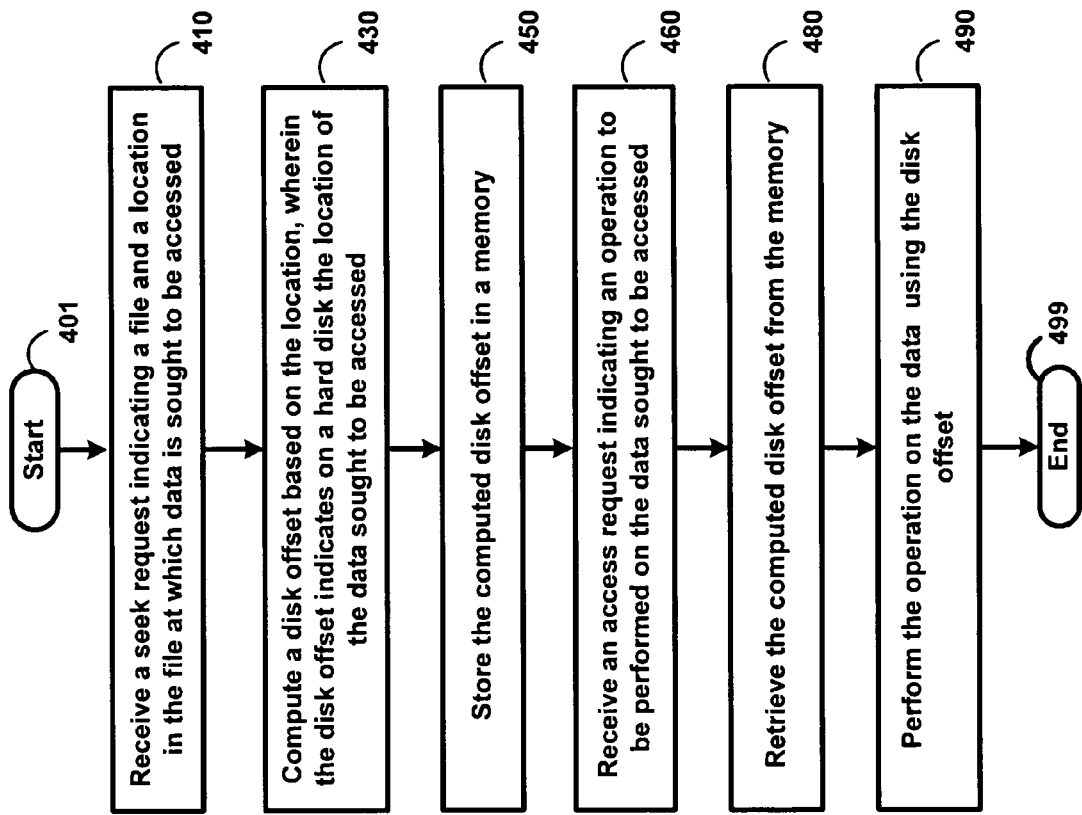
FIG. 4 is a flow chart illustrating the manner in which the access time for data in file systems is reduced when seek requests are received ahead of access requests in an embodiment of the present invention.

FIG. 4 is a flow chart illustrating the manner in which the access time for data in file systems is reduced when seek requests are received ahead of access requests in an embodiment of the present invention. The flowchart is described with respect to FIGS. 1, 2 and 3A-3C merely for illustration. However, the features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 401, in which control immediately passes to step 410.

In step 410, kernel 240 receives a seek request indicating (an identifier of) a file and a location in the file at which data is sought to be accessed. The seek request may be received in response to user applications 210A-210C invoking appropriate routines/functions such as a seek routine in library 230. The identifier of the file may specify a file number according to the file descriptor table or the name/path of the file in file system 250. The location of the file is specified as the number of bytes from the start of the file (assumed to be 0).

In response to the seek request, kernel 240 stores the location in the file in a memory for later usage when processing access requests. In one embodiment, kernel 240 sets the current pointer field (e.g. 312A) of the file descriptor corresponding to the file in open files table 310 to the location specified in the seek request. Kernel 240 may then send a response to the seek request indicating the status of updating the current pointer field.

In step 430, kernel 240 computes a disk offset based on the location (stored in the current pointer field), wherein the disk offset indicates on a hard disk (such as disk 270) the location of the data sought to be accessed. In one embodiment, the disk offset is represented by the disk block number and the computation of the disk offset is performed similar to the prior approach described above.

In step 450, kernel 240 stores the computed disk offset in a memory, for example, RAM 120. The computed disk offset may be stored as a new field in the file descriptor corresponding to the file (specified in the seek request) in open files table 310.

In one embodiment described below, kernel 240 maintains the computed disk offset associated with the combination of a unique identifier of the file (e.g. the file node number) and the location received in the seek request in a cache in RAM 120. Accordingly, a single cache can maintain the disk offsets for different combinations of files and corresponding locations. Further, the associations in the cache may be maintained according to a hashing algorithm thereby reducing the time for retrieving the stored disk offsets.

It may be appreciated that kernel 240 may be designed to perform the steps 430 and 450 in a separate thread (or as a child process), thereby enabling kernel 240 to receive seek/access requests independent of the computation of the disk offset.

In step 460, kernel 240 receives an access request indicating an operation (read/write) to be performed in the data sought to be accessed. As described above, the access request may also indicate the identifier (file number or name/path) of the file, the number of bytes sought to be accessed (from the location indicated in the seek request) and also the new data sought to be stored (in the case of write operation).

In step 480, kernel 240 retrieves the computed disk offset from the memory in response to receiving the access request. The computed disk offset may be retrieved from the new field in the file descriptor corresponding to the file (specified in the access request) in open files table 310.

In the embodiment where the computed disk offsets are maintained in a cache, kernel 240 first determines the file node number (e.g. 10000) corresponding to the file sought to be accessed by inspecting the data structures shown in FIG. 3A (and using the identifier in the access request). Kernel 240 then retrieves the computed disk offset corresponding to combination of the determined file node number and the location of the data sought to be accessed (as indicated by the current pointer field) from the cache. As described above, a hashing algorithm can be used to reduce the retrieval time.

It may be appreciated that the access request may be received before the disk offset is computed and stored in memory (in particular, when steps 430 and 450 are performed independently in a separate thread/process). In such a scenario, kernel 240 may be designed to wait for the disk offset to be stored in the memory/cache. Alternatively, kernel 240 may start the computation of the disk offset as described above and then store the computed disk offset in memory/cache.

In step 490, kernel 240 performs/executes the requested operation (read/write) on the data using the disk offset similar to the prior approach described above. Kernel 240 may then send a response to the access request containing the data sought to be read/retrieved (in case of a read operation) and also the status of execution of the operation. The flow chart ends in step 499.

Thus, by performing the computation of the disk offset before receiving the access request, the overall access time (between receiving the access request in step 460 and sending the corresponding response after step 490) is reduced, since the time taken to retrieve the disk offset from the memory is generally less than time taken to traverses a (large) file node tree.

Such a feature may be particularly desirable in scenarios when seek requests are received well ahead of the access requests. In other words, the time period between receiving a seek request indicating a specific file/location and a following access request indicating the operation to be performed is generally large (in terms of seconds/milliseconds), thereby enabling kernel 240 to perform the computation and storage of the disk offset before the access requests are received.

It should be appreciated that the features described above can be implemented in various embodiments as a desired combination of one or more of hardware, executable modules, and firmware. The manner in which the executable modules constituting kernel 240 can be modified to incorporate the several features of the present invention is described below with examples.

8. Example Implementation

Figures 5, 6:
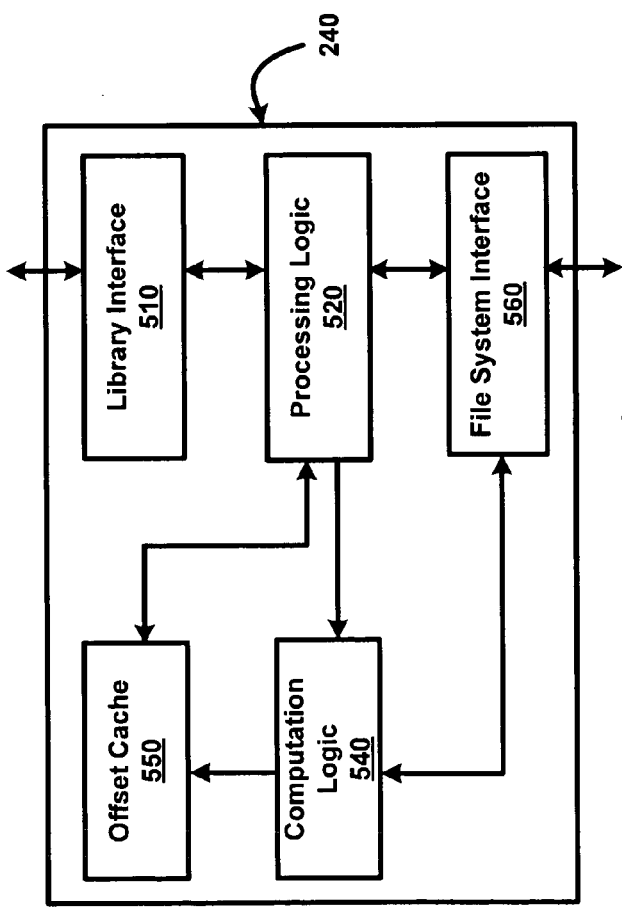
FIG. 5 is a block diagram illustrating the internal details of the kernel of an operating system designed to reduce access time for data in a file system in one embodiment.
FIG. 6 depicts portions of a cache maintaining computed disk offsets in one embodiment.
Figure 3A:
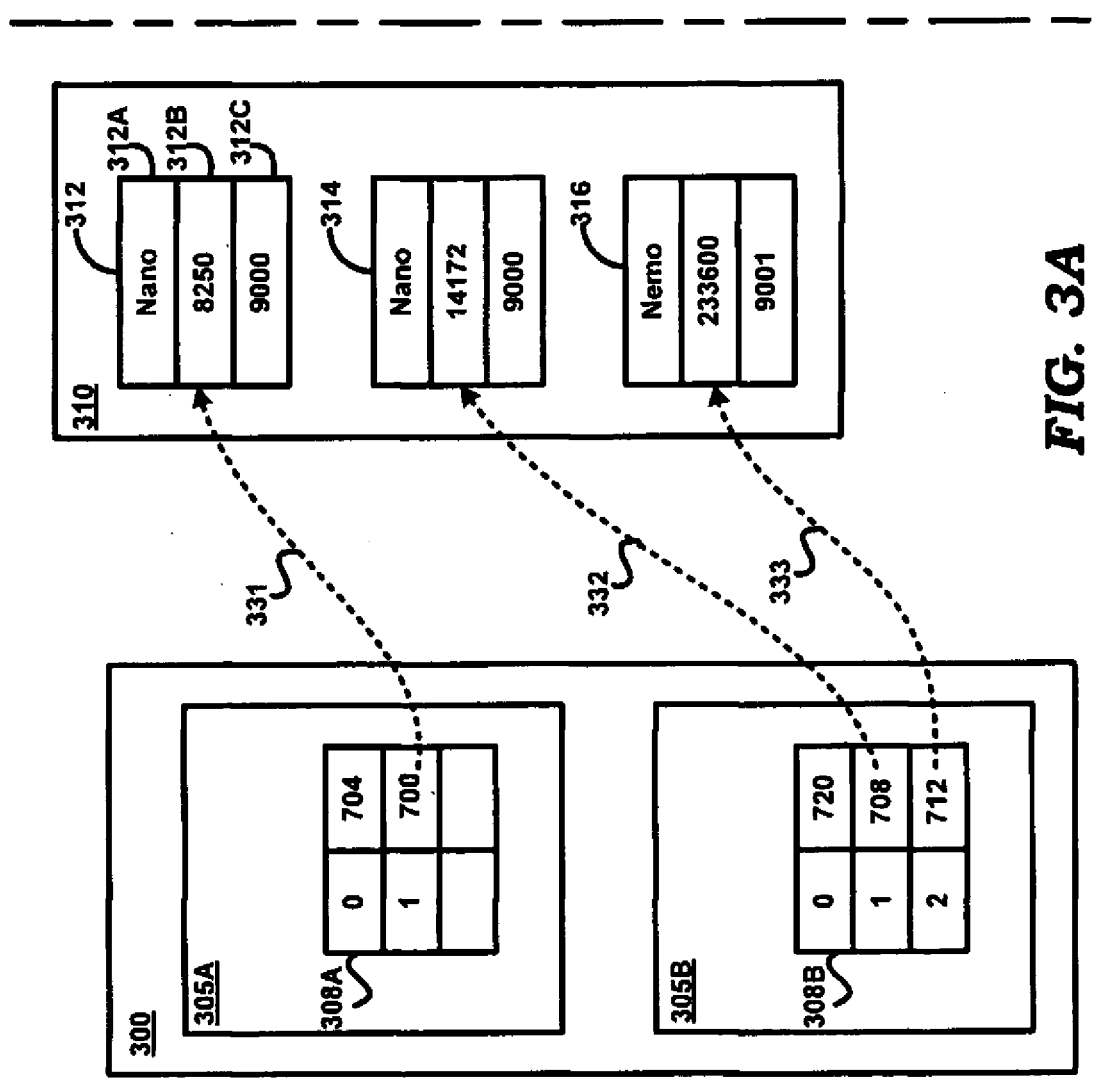

FIG. 5 is a block diagram illustrating the internal details of kernel 240 designed to reduce access time for data in file system 250 in one embodiment. Kernel 240 is shown containing library interface 510, processing logic 520, computation logic 540, offset cache 550 and file system interface 560. Each block is described in detail below.

Library interface 510 receives seek/access requests from user applications such as 210A-210C (in response to invocation of routines/functions in library 230) and forwards the requests to processing logic 520. The requests may be received according to suitable programming interfaces, as will be apparent to one skilled in the arts. Library interface 510 may also perform validation of the data received in the requests. Library interface 510 then receives responses (corresponding to the forwarded requests) from processing logic 520 and sends the responses to the invoking routines/functions in library 230.

File system interface 560 enables processing logic 520 and computation logic 540 to access the data structures maintained by file system 250. Thus, in response to receiving requests to access desired file nodes (identified by file node numbers), file system interface 560 retrieves the data contained in the identified file nodes from disk 270 and sends the retrieved data as corresponding responses. File system interface 560 further stores/retrieves data from/to disk blocks in disk 270 based on requests received from processing logic 520 or computation logic 540. File system interface 560 may also be designed to keep track of the disk blocks retrieved from disk 270 in a buffer, thereby enabling read/write operations to be performed more efficiently, as will apparent to one skilled in the relevant arts.

Processing logic 520 processes the seek/access requests received from library interface 510 and sends corresponding responses to library interface 510. In response to receiving a seek request, processing logic 520 sets the current pointer of the file to the location/value specified in the seek request as described above with respect to FIG. 3A and then sends a response indicating the status of updating the current pointer. Processing logic 520 also sends an indication to computation logic 640 indicating that the disk offset corresponding to the file identifier and the location is required to be computed.

In one embodiment, the indication sent to computation logic 540 contains the file node number and the location within the file. Multiple indications are maintained in the form of a queue, with processing logic 520 designed to add indications to the back of the queue and computating logic 540 designed to remove and process indication from the front of the queue.

Computation logic 640 processes the indications received (either directly or using the queue) from processing logic 520. In response to receiving an indication indicating a specific file node number and a location within the file, computation logic 640 computes the disk offset corresponding to the location based on traversing the file node tree using file system interface 560. Computation logic 640 then stores the computed disk offset associated with the file node number and the location in offset cache 550 as described in detail below.

FIG. 6 depicts portions of a cache maintaining computed disk offsets in one embodiment. The cache data is shown in the form of a table containing a few rows/columns as necessary for understanding the specific embodiments/examples. However various implementations of the cache can be performed using other types of data structures such as associative array and can include other desired columns/rows without departing from the scope and spirit of several aspects of the present invention.

Offset cache 550 is shown containing column 621 labeled "File Node" specifying the file node number of a file, column 622 "File Location" specifying the location within the file (in terms of the number of bytes from the beginning of the file) and column 623 labeled "Disk Offset" specifying the disk block number computed corresponding to the combination of the file node number and the location within the file.

Each of rows 651-653 specify an association of combination of the file node number (in column 621) of a file and the location within the file (in column 622) to the corresponding computed disk offset (in column 623). In particular, row 651 indicates that the computed disk offset "50101" corresponds to the combination of the file node number "10000" and the file location of "8250". It may be observed that rows 651 and 652 are related to the same file (as indicated by the same file node number) that whose data is sought to be accessed at different locations (e.g. by different processes).

Referring back to FIG. 5, processing logic 520 on receiving an access request forwarded from library interface 510, first determines whether the combination of the file node number for the file sought to be accessed (as indicated by the file identifier in the access request) and the location within the file (as indicated by the current pointer field in the file descriptor corresponding to the file) is present in offset cache 550.

Processing logic 520 then either retrieves the computed disk offset (disk block number) from offset cache 550 (if offset is present) or computes the disk offset similar to the prior approach described above (if the offset is not present). Processing logic 520 then executes the operation specified in the access request on the data stored in the specific disk block using file system interface 560 and sends the result/status of execution as a response to the access request.

It may be appreciated that processing logic 520 computes the 'internal' offset within the disk block (identified by the disk block number), for performing the read/write operation. In one embodiment, such computation is performed when processing the access request since the computation of 'internal' offset can be implemented as a modulo operation (which requires relatively less computation resource time, and thus does not increase substantially the access time).

However, alternative embodiments can be implemented to compute the internal offset along with the disk offset, and to store the internal offset in offset cache 550 (as an additional column, not shown). Accordingly processing logic 520 may be implemented to retrieve both the disk offset and the internal offset from offset cache 550, and perform the requested operation specified in the access request.

Thus, kernel 240 (in general, the operating system) described above reduces the access time for data in file systems, in particular when access to the data in the file system is performed by seek requests received ahead of access requests.

An aspect of the present invention enables user applications to control the use of disk offset caching by operating system 220 (in particular kernel 240). In one embodiment, the seek routine in library 230 is designed to accept an additional parameter named cache offset flag, with a true value for the parameter indicating that the disk offset is to be computed and stored/cached in memory and a false value indicating otherwise. The seek routine is designed to include the value of the cache offset flag in the seek requests sent to kernel 240, while kernel 240 is also designed to compute and store/cache the disk offset only when the value of the cache offset flag is true. Thus, user applications are enabled to control the use of disk offset caching.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of reducing access time for data in a plurality of files stored in a file system, wherein said file system is maintained in the form of a plurality of disk blocks on a non-volatile storage, wherein data in each of said plurality of files is stored in the form of a corresponding set of disk blocks contained in said plurality of disk blocks, said method being implemented in an operating system, said method comprising:
   receiving a seek request indicating an identifier of a first file and a location in said first file at which a first data is sought to be accessed, wherein said first file is contained in said plurality of files and the data in said first file is stored in the form of a first set of disk blocks contained in said plurality of disk blocks;
   computing an offset of a first disk block containing said location in said first file, whereby said first disk block contains said first data that is sought to be accessed, said first disk block being contained in said first set of disk blocks;
   receiving an access request indicating an operation to be performed on said first data at said location in said first file; and
   executing said operation on said first data using said offset of said first disk block,
   wherein said computing is performed before said access request is received by said operating system.

2. The method of claim 1, further comprising:
   storing in a memory said offset associated with said identifier of said first file and said location in said first file, wherein said storing is performed after said computing; and
   retrieving said offset from said memory in response to said receiving said access request, wherein said executing uses said offset retrieved from said memory.

3. The method of claim 2, further comprising:
   receiving a second access request indicating another operation to be performed on said first data at said location in said first file;
   determining whether said offset corresponding to said identifier of said first file and said location is already computed and stored in said memory; and
   executing said another operation on said first data using said offset retrieved from said memory if said determining determines that said offset is already stored in said memory; and
   otherwise performing said executing another operation after said computing said offset.

4. The method of claim 3, further comprising:
   receiving a second seek request indicating said identifier of said first file and said location in said first file prior to said second access request,
   wherein said computing computes said offset only if said offset is not already stored in said memory.

5. The method of claim 4, wherein said seek request and then said access request are received from a user application, wherein said second seek request and then said second access request are received from another user application, wherein said user application and said another user application are executed in the context of said operating system.

6. The method of claim 2, wherein said seek request and then said access request are received from a user application, said method further comprising:
   sending to said user application a response for said access request indicating a result of said executing said operation on said first data.

7. The method of claim 6, wherein said operation is a read, wherein said result comprises said first data at said location in said first file.

8. The method of claim 6, wherein said operation is a write, wherein said access request further comprises a second data, wherein said result comprises the status of replacing said first data at said location in said first file with said second data contained in said access request.

9. The method of claim 6, wherein said operating system maintains a metadata corresponding to each of said plurality of files, said method further comprising:
   setting a current pointer field to said location in response to receiving said seek request from said user application, wherein said current pointer field is contained in the metadata corresponding to said first file; and
   sending to said user application a response for said seek request indicating a result of said setting,
   wherein said computing said offset is performed based on said location stored in said current pointer field.

10. A system for reducing access time for data stored in a file system, said system comprising:
   a processor;
   a random access memory;
   a non-volatile storage storing said data in said file system in the form of a plurality of disk blocks, wherein each of a plurality of files contained in said file system is stored in the form of a corresponding set of disk blocks contained in said plurality of disk blocks; and
   a machine readable medium storing one or more sequences of instructions comprising an operating system, wherein execution of said one or more sequences of instructions by said processor causes said system to perform the actions of:
   receiving a seek request indicating an identifier of a first file and a location in said first file at which a first data is sought to be accessed, wherein said first file is contained in said plurality of files and the data in said first file is stored in the form of a first set of disk blocks contained in said plurality of disk blocks;

computing an offset of a first disk block containing said location in said first file, whereby said first disk block contains said first data that is sought to be accessed, said first disk block being contained in said first set of disk blocks;

receiving an access request indicating an operation to be performed on said first data at said location in said first file; and executing said operation on said first data using said offset of said first disk block, wherein said computing is performed before said access request is received by said operating system.

11. The system of claim 10, wherein said machine readable medium further comprises one or more instructions for:

storing in said random access memory said offset associated with said identifier of said first file and said location in said first file, wherein said storing is performed after said computing; and retrieving said offset from said random access memory in response to said receiving said access request, wherein said executing uses said offset retrieved from said memory.

12. The system of claim 11, wherein said seek request and then said access request are received from a user application executing in the context of said operating system, wherein said machine readable medium further comprises one or more instructions for:

sending to said user application a response for said access request indicating a result of said executing said operation on said first data.

13. The system of claim 12, wherein said operation is a read, wherein said result comprises said first data at said location in said first file.

14. The system of claim 13, wherein said operation is a write, wherein said access request further comprises a second data, wherein said result comprises the status of replacing said first data at said location in said first file with said second data contained in said access request.

15. The system of claim 12, wherein said operating system maintains a metadata corresponding to each of said plurality of files, wherein said machine readable medium further comprises one or more instructions for:

setting a current pointer field to said location in response to receiving said seek request from said user application, wherein said current pointer field is contained in the metadata corresponding to said first file; and sending to said user application a response for said seek request indicating a result of said setting, wherein said computing said offset is performed based on said location stored in said current pointer field.

16. A machine readable medium carrying one or more sequences of instructions for causing a system to reduce access time for data in a plurality of files stored in a file system, wherein said file system is maintained in the form of a plurality of disk blocks on a non-volatile storage, wherein data in each of said plurality of files is stored in the form of a corresponding set of disk blocks contained in said plurality of disk blocks, wherein execution of said one or more sequences of instructions by one or more processors contained in said system causes said system to perform the actions of:

receiving a seek request indicating an identifier of a first file and a location in said first file at which a first data is sought to be accessed, wherein said first file is contained in said plurality of files and the data in said first file is stored in the form of a first set of disk blocks contained in said plurality of disk blocks;

computing an offset of a first disk block containing said location in said first file, whereby said first disk block contains said first data that is sought to be accessed, said first disk block being contained in said first set of disk blocks;

receiving an access request indicating an operation to be performed on said first data at said location in said first file; and executing said operation on said first data using said offset of said first disk block, wherein said computing is performed before said access request is received.

17. The machine readable medium of claim 16, further comprising one or more instructions for:

storing in a memory said offset associated with said identifier of said first file and said location in said first file, wherein said storing is performed after said computing; and retrieving said offset from said memory in response to said receiving said access request, wherein said executing uses said offset retrieved from said memory.

18. The machine readable medium of claim 17, further comprising one or more instructions for:

receiving a second access request indicating another operation to be performed on said first data at said location in said first file;

determining whether said offset corresponding to said identifier of said first file and said location is already computed and stored in said memory; and executing said another operation on said first data using said offset retrieved from said memory if said determining determines that said offset is already stored in said memory; and otherwise performing said executing another operation after said computing said offset.

19. The machine readable medium of claim 18, further comprising one or more instructions for:

receiving a second seek request indicating said identifier of said first file and said location in said first file prior to said second access request, wherein said computing computes said offset only if said offset is not already stored in said memory.

20. The machine readable medium of claim 19, wherein said seek request and then said access request are received from a user application, wherein said second seek request and then said second access request are received from another user application, wherein said user application and said another user application are executed in the context of an operating system.

* * * * *

UNITED STATES PATENT AND TRADEMARK OFFICE
CERTIFICATE OF CORRECTION

Page 1 of 2

PATENT NO. : 8,037,058 B2
APPLICATION NO. : 12/420834
DATED : October 11, 2011
INVENTOR(S) : Venkataraja It is certified that error appears in the above-identified patent and that said Letters Patent is hereby corrected as shown below:

On attached sheet 3 of 7, in figure 3A, Reference Numeral 31, line 1, delete "Nemo" and insert -- Nano --, therefor.

Signed and Sealed this
Thirty-first Day of July, 2012

David J. Kappos
*Director of the United States Patent and Trademark Office*